United States Patent

[11] 3,622,572

| [72] | Inventor | John Krapcho |
| | | Somerset, N.J. |
| [21] | Appl. No. | 812,346 |
| [22] | Filed | Apr. 1, 1969 |
| [45] | Patented | Nov. 23, 1971 |
| [73] | Assignee | E. R. Squibb & Sons, Inc. |
| | | New York, N.Y. |

[54] PROCESS FOR PRODUCING MORPHOLINOALKYL BENZOTHIAZINONES AND RELATED COMPOUNDS
6 Claims, No Drawings

[52] U.S. Cl. ........................................... 260/243 R,
260/247.2 A
[51] Int. Cl. ............................................ C07d 93/12,
C07d 87/42
[50] Field of Search .................................. 260/243,
247.2 A

[56] References Cited
UNITED STATES PATENTS

| 3,166,554 | 1/1965 | Krapcho | 260/243 |
| 3,341,519 | 9/1967 | Krapcho | 260/243 |
| 3,475,423 | 10/1969 | Krapcho | 260/243 |

*Primary Examiner*—John M. Ford
*Attorneys*—Lawrence S. Levinson, Merle J. Smith and Theodore J. Criares

ABSTRACT: Basically substituted benzothiazinones, benzoxazinones, dihydroquinolinones and benzazepinones are obtained in greatly improved yield and with simplified isolation procedures when the basic side chain is introduced using dimethylsulfoxide as the reaction medium.

PROCESS FOR PRODUCING MORPHOLINOALKYL BENZOTHIAZINONES AND RELATED COMPOUNDS

BRIEF SUMMARY OF THE INVENTION

My U.S. Pat. Nos. 3,089,872 (issued May 14, 1963) and 3,401,166 (issued Sept. 10, 1968) and copending application Ser. No. 567,831 (filed July 26, 1966, now abandoned) disclose, among other compounds, groups of basically substituted benzothiazinones, benzoxazinones, dihydroquinolinones and benzazepinones. When a morpholino-lower alkylene side chain is introduced into the cyclic intermediate according to the procedures described in those patents and application, the final product is obtained in low yield and additionally is difficult to isolate from unreacted starting material. For example, a compound according to the procedure of U.S. Pat. No. 3,089,872 in diethylene glycol dimethyl ether in a yield of the order of 10 percent can be obtained in a yield of about 30 percent when dimethylformamide is substituted as the reaction medium. In both instances difficulties are encountered in purification of the product due to the presence of unreacted starting material. The same product may be obtained, however, in a yield of about 85 percent when dimethyl sulfoxide is used according to this invention. In addition, the product is readily purified.

DETAILED DESCRIPTION OF THE INVENTION

The U.S. patents and patent application referred to above disclose, among others, basically substituted bicyclic benzothiazinones, benzoxazinones and dihydroquinolines which may be characterized by the following general formula (I)
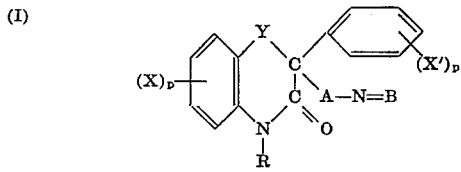

wherein Y is oxa (-O-), thia (-S-), methylene (-CH$_2$-) or ethylene (-CH$_2$CH$_2$-), preferably Y is thia, R represents lower alkyl, lower alkenyl, aralkyl or aralkenyl; X and X', which may be the same or different, each represents hydrogen, lower alkyl, halogen, halo-lower alkyl or lower alkoxy; A represents lower alkylene, N=B represents an unsubstituted or substituted morpholino radical, and $p$ is 1, 2 or 3. The terms "lower alkyl," "lower alkoxy" and "lower alkylene" include both straight and branched chain radicals of less than eight carbon atoms, for example, methyl, ethyl, propyl, isopropyl, butyl, isobutyl, t-butyl, amyl, methoxy, ethoxy, propoxy, isopropoxy, ethylene, propylene and the like. The term "lower alkenyl" refers to straight and branched chain unsaturated hydrocarbon radicals of less than eight carbon atoms such as allyl, butenyl, isobutenyl and the like. The aralkyl groups represented by the symbol R include monocyclic aralkyl groups such as phenyl-lower alkyl groups wherein the lower alkyl group is the same as defined above. The aralkenyl groups represented by R are monocyclic aralkenyl groups such as phenyl-lower alkenyl wherein the alkenyl group is the same as defined above, e.g., cinnamyl. The halo-lower alkyl groups may be monohalogenated such as chloromethyl or polyhalogenated such as trifluoromethyl which is preferred. All four halogens are contemplated by the symbol X.

This invention is applicable when the symbol N=B represents morpholino or a substituted morpholino radical such as (lower alkyl)morpholino, e.g., 2- or 3-methylmorpholino, 2- or 3-ethylmorpholino or di(lower alkyl)morpholino, e.g., 2,6-dimethylmorpholino, 3,5-dimethylmorpholino, and the like.

According to this invention benzothiazinones, benzoxazinones, dihydroquolinones and benzazepinones of the type of formula I are produced by reacting a benzothiazinone, benzoxazinone, dihydroquinolinone or benzazepinone lacking the basic side chain, e.g., compounds of the general formula (II)
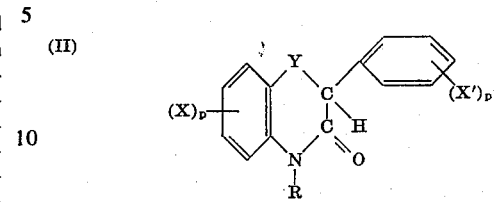

wherein the symbols have the same meaning as above, with a morpholino alkyl halide of the general formula (III)

wherein the symbols have the same meaning as above and Hal refers to a halogen, preferably chlorine or bromide, in the presence of an alkali metal hydride such as sodium hydride. The medium for this reaction, in order to achieve the high yields according to this invention, is dimethyl sulfoxide.

The starting ring compound and/or the metal hydride may be dissolved or suspended in the dimethyl sulfoxide and the one added to the other preferably maintaining the temperature below about 50° C. To this mixture the morpholinoalkyl halide, either as the liquid or as a solution in dimethyl sulfoxide, is added. A small amount of sodium iodide may also be added at this time to accelerate the reaction. The mixture is then permitted to react for a sufficient time for the condensation to be completed. One to two hours will usually suffice. Moderate heating, e.g., up to about 70°–75° C., may be used to accelerate the reaction. The reaction product may then be separated and worked up, for example, by pouring onto ice water. The solid or oily product is triturated with cold water, dissolved in chloroform and the latter solution is washed with water, dried (MgSO$_4$) and the solvent removed under reduced pressure to give the product.

The following example are illustrative of the invention. All temperatures are on the Centigrade scale.

EXAMPLE 1

4-methyl-2-(2-morpholinoethyl)-2-phenyl-1,4-benzothiazin-3(4H)-one

To a stirred suspension of 76.2 g. (0.3 mole) of 4-methyl2-phenyl-1,4-benzothiazin-3(4H)-one in 470 ml. of dimethyl sulfoxide (under N$_2$) are added 15.0 g. (0.3 mole) of sodium hydride, 50 percent (portionwise). The vigorous foaming subsides after several minutes; the orange-colored mixture is heated to 70°, cooled to 30° and treated with 70.0 g. (0.47 mole) of 2-morpholinoethyl chloride and 3.0 g. of pulverized sodium iodide. This mixture is slowly heated to 70° and maintained at 70°–75° for 2 hours. It is cooled to room temperature and poured onto 2.5 l. of cold water to give a light brown gummy product. After cooling overnight, the aqueous phase is decanted from the solid product; the latter is triturated with 500 ml. of cold water and then dissolved in 600 ml. of chloroform. The latter solution is extracted with 200 ml. of water, dried over MgSO$_4$, treated with charcoal, filtered and the solvent evaporated to give a residue which is digested with 200 ml. of warm hexane, cooled and filtered to give 101.5 g. (92 percent) of material, m.p. 131°–136°. Following crystallization from 210 ml. of acetonitrile the colorless solid weighs 94.0 g. (85 percent); m.p. 140°–142°.

The hydrochloride salt is obtained by dissolving this base in 100 ml. of chloroform. treating with one equivalent of alcoholic HCl and removing the solvent under reduced pressure. The foamlike residue is triturated with ether and filtered to give 28.4 g. of material, m.p. 203°–205°. Following crystallization from 150 ml. of isopropanol, the product weighs 26.4 g., m.p. 208°–210°.

EXAMPLE 2

4-methyl-2-(3-morpholinopropyl)-2-phenyl-2H-1,4-benzothiazin-3(4H)-one

Utilizing the procedure of example 1, a mixture of 19.8 g. (0.078 mole) of 4-methyl-2-phenyl-1,4-benzothiazin-3(4H)-one, 170 ml. of dimethylsulfoxide and 3.8 g. (0.078 mole) of 50 percent sodium hydride is treated with 1 g. of sodium iodide and 25 g. of 3-morpholinopropyl chloride and then heated at 70°–75° for 3 hours. The product is isolated as in example 1 to give 31.6 g. of a pale yellow oil. The hydrochloride salt of this material melts at 235°–237° (from ethanol).

EXAMPLE 3

2-[2,6-Dimethylmorpholino)ethyl]-4-methyl-2-phenyl-2H-1,4-benzothiazin-3(4H)-one Utilizing the procedure of example 1, but substituting 20.0 g. of 2-(2,6-dimethylmorpholino)ethyl chloride for the 2-morpholinoethyl chloride, there is obtained 28.5 g. of the syruplike base. The hydrochloride salt melts at 227°–229° (crystallized from acetonitrile).

EXAMPLE 4

2-(p-chlorophenyl)-4-methyl-2-(2-morpholineothyl)-2H-1,4-benzothiazin-3(4H)-one

Utilizing the procedure of example 1, a mixture of 29.0 g. (0.1 mole) of 2-(p-chlorophenyl)-4-methyl-2H-1,4-benzothiazin-3(4H)-one, 170 ml. of dimethylsulfoxide and 5.0 g. of sodium hydride (50 percent) is treated with 1 g. of sodium iodide and 30.0 g. of 2-morpholinoethyl chloride and then heated at 75° for 2 hours. The product (31.5 g., m.p. 120°–125°) is purified by crystallization from 100 ml. of acetonitrile, m.p. 127°–129°.

EXAMPLE 5

2-p-methoxphenyl-4-methyl-2(2-morpholinoethyl)-2H-1,4-benzothiazin-3(4H)-one

Interaction of 20.0 g. (0.07 mole) of 2-(p-methoxyphenyl)-4-methyl-2H-1,4-benzothiazin-3(4H)-one, 170 ml. of dimethyl sulfoxide and 3.5 g. (0.073 mole) of 50 percent sodium hydride with 1 g. of sodium iodide and 21 g. of 2-morpholinoethyl chloride in the manner described in example 1 gives 17.7 g. of viscous product. The hydrobromide salt of this material melts at 163°–165° (from ethanol).

EXAMPLE 6

4-Benzyl-2-(2-morpholinoethyl)-2-phenyl-2H-1,4-benzothiazin-3(4H)-one

Interaction of 34.2 g. (0.1 mole) of 4-benzyl-2-phenyl-1,4-benzothiazin-3(4H)-one, 170 ml. of dimethyl sulfoxide, 51 g. (0.1 mole) sodium hydride, 30.0 g. of 2-morpholinoethyl chloride and 1 g. of sodium iodide as described in example 1 gives a product which is crystallized from 200 ml. of diisopropyl ether; weight 26.0 g., m.p. 114°–116°. After crystallization from cyclohexane, the product melts at 117°–119°.

EXAMPLE 7

2-(2-Morpholinoethyl)-4-phenethyl-2-phenyl-2H-1,4-benzothiazin-3-(4H)-one

Interaction of 20.0 (0.058 mole) of 4-phenethyl-2-phenyl-1,4-benzothiazin-3(4H)-one, 100 ml. of dimethyl sulfoxide, 3.0 g. (0.058 mole) sodium hydride, 17 g. of 2-morpholineothyl chloride and 1 g. of sodium iodide according to the procedure of example 1 gives the product which is purified by crystallization from 200 ml. of diisopropyl ether; weight, 12.6 g., m.p. 103°–105°.

EXAMPLE 8

4-Methyl-2-morpholinoethyl)-2-phenyl-1,4-benzoxazin-3(4H)-one

Utilizing the procedure of example 1 but substituting an equivalent quantity of 4-methyl-2-phenyl-1,4-benzoxazin-3-(4H)-one for the 4-methyl-2-phenyl-1,4-benzoxazin-3(4H)-one, the above named product is obtained.

EXAMPLE 9

3,4-Dihydro-1-methyl-3-(2-morpholinoethyl)-3-phenylquinolin-2-one

Following the procedure of example 1 but substituting an equivalent quantity of 3,4-dihydro-1-methyl-3-phenylquinolin-2-one for the 4-methyl-2-phenyl-1,4-benzothiazin-3(4H)-one, the above named product is obtained.

EXAMPLE 10

1,3,4,5-Tetrahydro-1-methyl-3-(2-morpholinoethyl)-3-phenyl-1-benzazepin-2-one

By substitution of an equivalent quantity of 1,3,4,5-tetrahydro-1-methyl-3-phenyl-1-benzazepin-2-one in example 1 for the 4-methyl-2-phenyl-1,4-benzothiazin-3(4H)-one, the above named product is obtained.

What is claimed is:

1. A method for producing a compound of the formula

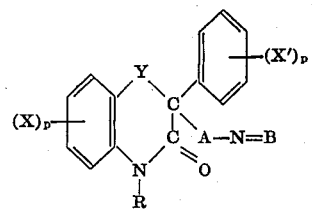

wherein Y is oxa, thia, methylene or ethylene, R is lower alkyl, lower alkenyl, phenyl-lower alkyl or phenyl-lower alkylene, X and X' each is hydrogen, lower alkyl halogen, halo-lower alkyl or lower alkoxy, p is 1,2 or 3, and A—N=B is a morpholino-lower alkylene radical,
by the addition of morpholino-lower alkyl side chain to a benothiazinone, benzoxazinone, dihydroquinolinone or benzazepinone of the formula

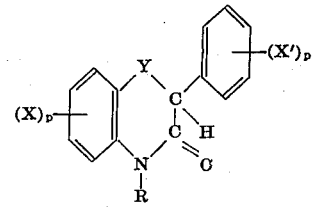

wherein Y. R. X, X' and p have the same meaning as above, which comprises reacting said benzothiazinone, benzoxazinone, dihydroquinolinone or benzazepinone with a morpholino-lower alkyl halide in dimethyl sulfoxide reaction medium.

2. A method as in claim 1 wherein Y is thia.

3. A method as in claim 1 wherein Y is thia and the morpholino-lower alkyl halide is morpholinoethyl chloride.

4. A method as in claim 1 wherein the benzothiazinone is 4-lower alkyl-2-phenyl-1,4-benzothiazin-3(4HO-one.

5. A method as in claim 5 wherein the benzothiazinone is 4-methyl-2-phenyl-1,4-benzothiazin-3(4H)-one.

6. A method as in claim 3 wherein the benzothiazinone is 4-methyl-2-phenyl-1,4-benzothiazin-3(4H)-one and the morpholino-lower alkyl halide is 3-morpholinopropyl chloride.

* * * * *